United States Patent [19]
Fishbein et al.

[11] 3,857,800
[45] Dec. 31, 1974

[54] FLEXIBLE POLYURETHANE FOAMS PREPARED FROM A MIXTURE OF POLYETHER POLYOLS

[75] Inventors: John Fishbein, Marlow; Raymond William Henry Bell, Great Kings Hill; Anthony James Clarke, Chinnor; Peter Merriman, Stratford-on-Avon, all of England

[73] Assignee: Dunlap Holdings Limited, London, England

[22] Filed: Oct. 15, 1973

[21] Appl. No.: 406,221

Related U.S. Application Data

[63] Continuation of Ser. No. 148,170, May 28, 1971, abandoned.

[30] Foreign Application Priority Data
June 19, 1970 Great Britain ................... 30000/70

[52] U.S. Cl. ..................... 260/2.5 AP, 260/2.5 AT
[51] Int. Cl. ............................................ C08g 22/46
[58] Field of Search .................. 260/2.5 AP, 2.5 AT

[56] References Cited
UNITED STATES PATENTS

| | | | |
|---|---|---|---|
| 3,194,773 | 7/1965 | Hostettler | 260/2.5 |
| 3,288,732 | 11/1966 | Chapman | 260/2.5 |
| 3,336,242 | 8/1967 | Hampson et al. | 260/2.5 |
| 3,546,145 | 12/1970 | Granger et al. | 260/2.5 |

FOREIGN PATENTS OR APPLICATIONS

| | | | |
|---|---|---|---|
| 1,048,312 | 11/1966 | Great Britain | 260/2.5 |
| 665,758 | 6/1963 | Canada | 260/2.5 |
| 1,025,242 | 4/1966 | Great Britain | 260/2.5 |

Primary Examiner—Eugene Rzucidlo
Attorney, Agent, or Firm—Stevens, Davis, Miller & Mosher

[57] ABSTRACT

A process is provided for making a flexible polyurethane foam by foaming a reaction mixture containing a polyol, an organic polyisocyanate and a blowing agent which would otherwise produce a closed cell foam which would shrink after its formation wherein the foamable reaction mixture is modified by including therein a subsidiary polyol which is different from the primary polyol and which has a molecular weight of about 500 to about 3500 and contains at least 40% by weight oxyethylene groups with at least some of them in a non-terminal position, the amount of subsidiary polyol being not more than 50% by weight of the total polyol in the reaction mixture.

15 Claims, No Drawings

FLEXIBLE POLYURETHANE FOAMS PREPARED FROM A MIXTURE OF POLYETHER POLYOLS

This is a continuation of application Ser. No. 148,170, filed May 28, 1971, now abandoned.

This invention relates to a process for the production of flexible polyurethane foams, and in particular relates to the use of special blends of polyols so as to obtain substantially non-shrinking foams.

Flexible polyurethane foams are conventionally made by the interaction in a foam-forming reaction mixture of an organic polyisocyanate with a polyether or polyester polyol. These foams are required, in general, to have an open-cell structure in which adjacent cells to a substantial extent communicate with one another, because if they are obtained having a substantial proportion of closed cells the result is that the forms shrink. In many cases such shrinkage can be obviated by a suitable choice of catalysts or additives, but recently foam formulations have come into commercial prominence for the production of highly resilient foams and flame-retardant foams which present severe shrinkage problems. Such foams are those obtained, for example, using polyisocyanates known as "crude T.D.I." or "crude M.D.I."

We have now found according to the present invention that in such circumstances substantially non-shrinking foams can be obtained if there is incorporated in the foam-forming reaction mixture as an anti-shrinkage agent a subsidiary polyol comprising a polyether polyol derived from ethylene oxide in which some at least of the oxyethylene groups are in non-terminal positions. The anti-shrinkage agent is conveniently one having a poly(oxyethylene) content of at least 20% by weight.

The subsidiary polyol can be, for example, a diol or a triol, and it can be derived from ethylene oxide as the sole alkylene oxide, or from ethylene oxide and another alkylene oxide such as propylene oxide. Where it is a diol or triol of this sort, it can, for example, be one containing from 20–80% (especially 40–70%) by weight of oxyethylene groups.

The subsidiary polyol is conveniently a poly(oxyethylene) poly(oxypropylene) polyol whose poly(oxypropylene) content has a molecular weight in the range 500–2000, for instance 800–1500. It can, for example, be a triol of molecular weight in the range 2000–3500. Where it has primary hydroxyl terminal groups they can comprise at least 25%, for example, 35–45%, of the terminal groups. Examples of suitable poly(oxyethylene) poly(oxypropylene) polyols are the commercial products G.978 and Propylan G.3650 of Lankro Chemicals Limited, and Pluronic L-35 of Wyandotte.

The subsidiary polyol can be a substance consisting substantially of oxyethylene groups, for example polyalkylene glycols. Polyethylene glycols of low molecular weight, for example in the range 300–800 have been found suitable.

The subsidiary polyol can be used in any suitable proportion with the major polyol, but we have found it to be effective in substantially obviating shrinkage of foams if it is used in an amount of from 2–40 (for example 4–15) parts of the total polyol component of the foam-forming reaction mixture. Care should be taken in the amount of the subsidiary polyol used because too much can lead to collapse of the foam, and therefore the amount of the subsidiary polyol in general will not be more than half of the weight of the polyol component. We have found that the amount of the subsidiary polyol required depends upon the mixing of the foam-forming ingredients. The more complete the mixing, the less of the subsidiary polyol is required.

The subsidiary polyol is preferably fed to the mixer for the foam-forming reaction mixture as a separate stream, though satisfactory results have been obtained where it has been previously blended with the major polyol and the blend fed to the mixer.

The polyol used as the major constituent of the polyol component in the production of the polyurethane foams of this invention is normally a polyether polyol having a high reactivity, though polyesters can be used. Suitable polyether polyols are those having a substantial proportion of primary hydroxyl end groups, usually referred to as "ethylene oxidetipped polyols", for example those in which the primary hydroxyl groups comprise 20, 30 or 40% to 70% (for example 50–60%) of the total number of hydroxyl groups in that polyol. Where the polyol is a triol a suitable molecular weight is in the range 3000–6000.

A suitable polymeric polyol is one obtained by reacting a substance having a plurality of active hydrogen atoms with an alkylene oxide (for instance propylene oxide or a mixture of propylene oxide and ethylene oxide), and subsequently reacting the product thus obtained with ethylene oxide so as to introduce the terminal primary hydroxyl groups. Polyether polyols of this type are commercially available under the trade name Desmophen 3900 (which is a polyether triol of very high activity having a mean molecular weight of 4500–5100 and an hydroxyl number of 33–37), and Propylan M.12 described below with reference to the Examples.

The foams of the invention can be, for example, foams of density up to 64 kg/m$^3$, especially having densities in the range 16–64 kg/m$^3$.

The polyisocyanate can be, for example, any of the polyisocyanates known in the art as being suitable for the production of flexible polyurethane foams of high resilience. Thus, tolylene diisocyanate (T.D.I.) can be used, either as crude T.D.I., in polymeric form or as an adduct with a polyhydroxy compound such as trimethylol propane.

Crude T.D.I. is the product obtained by reacting the appropriate diamino-toluene with phosgene without any substantial purification. It is believed to contain material of polyurea and polybiuret structure. Where a mixture of 2,4— and 2,6-diaminotoluene is used, the crude T.D.I. contains the corresponding 2,4- and 2,6-diisocyanates.

Polymeric T.D.I. can contain dimers and/or trimers. Dimers are generally of uretdione structure, and trimers are generally of isocyanurate structure. They can be obtained by treating T.D.I. with polymerisation catalysts as is well-known in the art.

Where T.D.I. is referred to herein it can contain one or more isomers thereof. For example, it can be tolylene-2,4-diisocyanate, tolylene-2,6-diisocyanate, or a mixture thereof, for instance in the proportions 65:35 (65:35 T.D.I.), or, preferably, 80:20 T.D.I. by weight.

Polyisocyanates other than ones derived from T.D.I. which can be used in the present invention include diaryl methane diisocyanates for example, 4,4'-diisocyanate diphenylmethane (M.D.I.) and polyphenyl polymethylene polyisocyanates. If M.D.I. is used it can be in pure or crude form. Crude M.D.I. is obtained by the interaction of aniline with formaldehyde followed by reaction of the product with phosgene, without substantial purification.

In general the polyisocyanate and polyol components can be used in amounts such that the isocyanate index is of a normal value, for example in the range 100–110. However, isocyanate index values outside that range can be used if desired.

Small amounts of amino catalysts may be used in the process of the invention if desired. Examples of tertiary amines which can be used are dimethyl ethanolamine, N-methyl and N-ethyl morpholines, triethylamine, and triethylene diamine (also known as 1,4-diazobicyclo 2,2,2- octane).

Under certain circumstances, for example when harder foams are required, cross-linking agents may be employed. Examples of suitable cross-linking agents are hydroxy amines, for example triethanolamine and tetrakis N beta-hydroxypropyl ethylene diamine (sold under the trade name Quadrol); low molecular weight polyols, such as tetrols; hydroxyethers, for example tris-hydroxypropyl glycerol, and ortho-dichloro methylene bis-aniline (M.O.C.A).

The invention is illustrated by the following Examples, in which flexible polyurethane foams are obtained by the one-shot or single stage method.

The meanings of various trade names used in the Examples are as follows: Propylan M.12 is the trade name of a polyether polyol sold by Lankro Chemicals Limited, and which is believed to be a poly(oxypropylene) poly(oxyethylene) triol having the following characteristics:

Molecular Weight about 5000
Hydroxyl No. 35–37
Poly(oxyethylene) content about 12–13% by weight It has a high proportion of primary hydroxyl end groups.

G.978 is an abbreviation for "Development Polyol G.978" sold by Lankro Chemicals Limited. It is used in the Examples as an anti-shrinkage agent, and is believed to consist essentially of a poly(oxyethylene) poly(oxypropylene) triol based on a glycerol "starter" and having a molecular weight of about 2800, a hydroxyl number of 53–59 and a poly(oxyethylene) content of about 64% by weight. The proportion of primary hydroxyl groups: secondary hydroxyl groups in this polyol is believed to be in the ratio 40:60, and the molecular weight of the propylene oxide content is about 910–920.

It will be seen that in Example 3 the polyol component contained a third polyol (as a crosslinking agent) referred to as "Quadrol" which is believed to consist essentially of the compound: $(CH_3CH(OH)CH_2)_2N-CH_2-CH_2-N_{(CH2)}-CH(OH)-CH_3)_2$ In the Examples the silicone MS.200/5 is a commercial silicone oil having a viscosity of 5 centistokes and believed to be a dimethyl silicone homopolymer, and the tris-dibromopropyl phosphate (T.B.P.P.) anti-ageing additive was used in the form of the commercial product Bromkal P. 67. Dabco 33LV is a commercial catalyst containing as active ingredient triethylamine diamine, that is, 1,4-diazobicyclo-2,2,2-octane. The T.D.I., except where stated otherwise, was 80:20 T.D.I. The hardness values were obtained under the test of BS.3667.

EXAMPLE 1

A flexible, free-rise polyurethane foam was obtained using the following formulation:

| | |
|---|---|
| Propylan M.12 } Polyol Component | { 90 |
| G.978 | 10 |
| Water | 3 |
| Sodium phenate catalyst | 0.4 |
| T.B.P.P. | 2 |
| Silicone MS.200/5 | 0.05 |
| T.D.I. | 36.5 |

In this Example, and in the other Examples, the amounts of the ingredients are shown in parts by weight. The procedure used to make the foam was as follows.

First, the silicone was dispersed in 2.5 parts of the Propylan M.12 polyol so as to provide a 2% dispersion; and the sodium phenate was dissolved in all of the water component. The remainder of the polyol component was then mixed with the T.B.P.P. and the polyol dispersion of the silicone by high speed stirring for 20 seconds. The aqueous solution of the sodium phenate was then added to the mixture and the whole was stirred for a further 15 seconds. Then the T.D.I. was added and the stirring was continued for a further 8 seconds, at the end of which time the resulting foam-forming reaction mixture started to "cream" and was immediately poured into an open mould.

The rise of the foam was completed in 90 seconds, and the foam was tack-free at the end of about 15 minutes after the pouring. At this time the resulting polyurethane moulding was removed from the mould.

The foam had a density of 29.4 kg/m$^3$ and a hardness of 6 kg. and did not shrink on cooling.

EXAMPLE 2

A flexible, free-rise polyurethane foam was obtained using the following formulation and the procedure described in Example 1:

| | |
|---|---|
| Propylan M.12 } Polyol Component | { 90 |
| G.978 | 10 |
| Water | 4 |
| Sodium phenate catalyst | 0.3 |
| Silicone MS.200/5 | 0.05 |
| T.B.P.P. | 2 |
| T.D.I. | 46.5 |

The foam had a density of 24 kg/m$^3$ and a hardness of 7–8 kg. and did not shrink on cooling.

EXAMPLE 3

A flexible, free-rise polyurethane foam was obtained using the following formulation and the procedure described in Example 1:

| | |
|---|---|
| Propylan M.12 } | { 82.5 |
| G.978 } Polyol Component | { 12.5 |
| Quadrol } | { 5 |
| T.B.P.P. | 2 |
| Water | 4 |
| Silicone MS.200/5 | 0.05 |
| Sodium phenate catalyst | 0.25 |
| T.D.I. | 52.4 |

The foam had a density of 25.0 kg/m$^3$ and a hardness of 13–15 kg. and did not shrink on cooling.

EXAMPLE 4

A flexible, polyurethane foam cushion was obtained by a cold-moulding technique using the following formulation:

| | | |
|---|---|---|
| Propylan M.12 } Polyol Component | { | 95 |
| G.978 } | { | 5 |
| Water | | 3 |
| Sodium phenate catalyst | | 0.5 |
| Triethylamine co-catalyst | | 0.4 |
| Silicone MS.200/5 | | 0.05 |
| T.B.P.P. | | 2 |
| T.D.I. | | 36 |

The foam-forming reaction mixture, obtained using the procedure of Example 1, the triethylamine being dissolved in the polyol, was dispensed into a methal mould which had been pre-heated to 50°C. A close-fitting lid was clamped into place on the mould by toggle clamps and the mould left for 10 minutes without any application of heat. The moulded product was then removed from the mould. It was found to have a density of 48 kg/m³ and did not shrink on cooling.

EXAMPLE 5

A flexible, free-rise polyurethane foam was obtained using the following formulation and the procedure described in Example 1:

| | | |
|---|---|---|
| Propylan M.12 } Polyol Component | { | 95 |
| G.978 } | { | 5 |
| Water | | 3 |
| Sodium phenate catalyst | | 0.4 |
| T.B.P.P. | | 2 |
| T.D.I. | | 41.2 |
| Silicone MS.200/5 | | 0.05 |

The foam had a density of 29 kg/m³ and a hardness of 10 kg. and did not shrink on cooling.

The foams of the Examples were all found to have excellent flame-retardance. When tested under the conditions of ASTM D 1692 67T the following results were obtained:

| | EXAMPLE | | | |
|---|---|---|---|---|
| | 1 | 2 | 4 | 5 |
| Mean extent burned (mm) | 14 | 29 | 13 | 22 |
| Burning time (seconds) | 10 | 22 | 13 | 24 |
| Burning rate (mm/second) | 1.4 | 1.32 | 1.0 | 0.91 |

Besides their excellent flame-retardance, the foams of these Examples were found to have high resilience - more than 50% as measured by the falling ball rebound test - and to show a relatively linear load-deflection relation.

EXAMPLE 6

A higly-resilient, flexible, free-rise polyurethane foam was obtained using the following formulation:

| | | |
|---|---|---|
| Propylan M.12 } Polyol Component | { | 95 |
| G.978 } | { | 5 |
| Triethanolamine | | 5 |
| Dabco 33LV | | 0.3 |
| Tetramethylethylene diamine | | 0.55 |
| Water | | 3 |
| T.B.P.P. | | 2 |
| Crude T.D.I. | | 56 |

The crude T.D.I. was a product sold by E.I.DuPont de Nemours under the trade name Hylene T.H.R., and is believed to be obtained by the interaction of a mixture of 2,4- and 2,6- diamino toluenes with phosgene, without substantial purification of the resulting product.

The procedure used to make the foam was as follows.

A first mix was obtained by mixing together the triethanolamine, Dabco 33LV, tetramethylethylene diamine and water; and this was then blended with the polyol component in which had been mixed the T.B.P.P. Then the polyisocyanate was stirred into the blend. When this mixed formulation started to "cream" it was poured into a mould.

The foam had a density of 32 kg/m³ and did not shrink on cooling.

EXAMPLE 7

A further highly-resilient, flexible, free-rise polyurethane foam was obtained using the following formulation and the procedure of Example 6.

| | | |
|---|---|---|
| Propylan M.12 } Polyol Component | { | 100 |
| G.978 } | { | 10 |
| Triethanolamine | | 1 |
| Water | | 2.4 |
| Dabco 33LV | | 1 |
| Triethylamine | | 0.3 |
| Blend of T.D.I. and crude M.D.I. in the proportion (by weight) of 45:55 | | 38.5 |

The foam had a density of 48 kg/m³ and did not shrink on cooling to room temperature.

The crude M.D.I. of Example 7 was the product sold by Farbenfabrieken Bayer A.G. under the Trade Mark Desmodur 44LV, which is believed to be obtained by the interaction of aniline and formaldehyde followed by treatment of the product with phosgene, without substantial purification.

EXAMPLE 8

A further open-cell, flexible polyurethane foam was obtained using the procedure of Example 1 and the following formulation:

| | | |
|---|---|---|
| Propylan M.12 } Polyol Component | { | 90 |
| G.978 } | { | 10 |
| Water | | 4.5 |
| T.B.P.P. | | 2 |
| Silicone MS.200/5 | | 0.05 |
| Sodium hydroxide | | 0.15 |
| 80:20 T.D.I. | | 54 |

The foam obtained had a density of 32 kg/m³ and did not shrink on cooling to room temperature.

EXAMPLES 9–11

These Examples illustrate the use of anti-shrinkage agents other than the polyol G.978 to obviate shrinkage of flexible foam products.

The procedure and formation of Example 8 was repeated except that the following amounts of anti-shrinkage agents were used instead of the G.978. In each case the total amount of Propylan M.12 and anti-shrinkage agent was 100 parts.

Example 9:

Polyol R.161 : 10–11.5 (for example 11) parts

Example 10:

Polyol 1138 : 7–9 (for example 8) parts

Example 11:

Polyethylene glycol (PEG 600) : 10–11.5 (for example 11) parts

The polyethylene glycol had a molecular weight of about 600. Polyol R.161 and Polyol DP 1138 are respectively polyether triols sold by Union Carbide Corporation and Lankro Chemicals Limited. They have molecular weights in the range 2500–3500 and poly-(oxyethylene) contents of about 65 and 79% by weight. The foam products obtained did not shrink on cooling and were self-extinguishing in ASTM D 1692 67T.

For the purpose of comparison the Examples were repeated but replacing the G.978 polyol or other anti-shrinkage agent with the same amount of extra Propylan M.12. It was found that the polyurethane foams thus obtained shrank considerably after being made, presumably due to their having a substantial content of closed cells.

Having now described our invention, what we claim is:

1. A flexible polyurethane foam having an open-cell structure in which adjacent cells communicate with one another to a substantial extent, said foam having been prepared by the process which comprises reacting an organic polyisocyanate and two different polyols of which one is (a) an ethylene oxide tipped polyol prepared by reacting propylene oxide or a mixture of propylene oxide and ethylene oxide with a polyhydric alcohol having three hydroxyl groups and then reacting the resulting product with ethylene oxide until an ethylene oxide tipped polyol having a molecular weight of 3000 to 6000 and in which from 20 to 70% of the total terminal hydroxyl groups are primary hydroxyl groups is obtained, and the other polyol (b) is an anti-shrinking agent for the foam and is a subsidiary polyol, said subsidiary polyol containing at least 40% by weight oxyethylene groups with at least some of the oxyethylene groups in non-terminal positions, said subsidiary polyol being a polyethylene ether glycol or a poly(oxyethylene) poly(oxypropylene) polyol having a poly(oxypropylene) molecular weight of 500 to 2000, said polyol (b) being not more than 50% by weight of the total polyol, said reaction mixture containing a blowing agent.

2. The product of claim 1 wherein the polyisocyanate component comprises an aromatic polyisocyanate, and the polyol component comprises (a) a poly(oxyethylene) poly(oxypropylene) polyol having a poly(oxyethylene) content of up to 20% by weight, and (b) as an anti-shrinkage agent for the foam, a polyether polyol derived from ethylene oxide and having a poly(oxyethylene) content of at least 20% by weight.

3. The product of claim 2 wherein polyol (b) is a poly(oxyethylene) poly(oxypropylene) polyol whose poly(oxypropylene) content has a molecular weight in the range 500–2000.

4. The product of claim 2 wherein polyol (b) has a poly(oxyethylene) content of 40–80% by weight.

5. The product of claim 2 wherein polyol (b) is a triol having a molecular weight of 2000–3500.

6. The product of claim 5 wherein 35–45% of the terminal hydroxyl groups of polyol (b) are primary hydroxyl groups.

7. The product of claim 2 wherein polyol (b) is a poly(oxyethylene) polyol.

8. The product of claim 7 wherein polyol (b) is a poly(oxyethylene) glycol.

9. The product of claim 2 wherein polyol (b) comprises 4–15 parts by weight of said polyol component.

10. The product of claim 2 wherein polyol (a) is a triol having a substantial proportion of primary hydroxyl groups.

11. The product of claim 1 wherein the polyisocyanate is a product obtained by the interaction of a diamino toluene and phosgene without substantial purification.

12. The product of the process of claim 1 wherein the polyisocyanate is a product obtained by the interaction of aniline and formaldehyde, followed by phosgenation of the resulting amine without substantial purification.

13. In a process for making a flexible polyurethane foam by foaming a reaction mixture containing a polyol, an organic polyisocyanate and a blowing agent which would otherwise produce a closed cell foam which would shrink after its formation, the step of modifying the said foamable mixture to avoid closed cells and shrinkage of the foam which comprises mixing with the foamable mixture a subsidiary polyol which is a polyethylene ether glycol or a poly(oxyethylene) poly(oxypropylene) polyol which has a poly(oxypropylene) molecular weight of about 500 to 2000 and contains at least 40% by weight oxyethylene groups with at least some of them in a non-terminal position, said subsidiary polyol being not more than 50% by weight of the total polyol in the reaction mixture.

14. The process of claim 13 wherein the polyiscoyanate contains the mixture of products obtained when tolylene diamine is phosgenated.

15. The process of claim 13 wherein the polyisocyanate contains the mixture of products obtained when diamino diphenylmethane is phosgenated.

* * * * *

UNITED STATES PATENT OFFICE
CERTIFICATE OF CORRECTION

Patent No. 3,857,800          Dated December 31, 1974

Inventor(s) John Fishbein et al.

It is certified that error appears in the above-identified patent and that said Letters Patent are hereby corrected as shown below:

The spelling of the third inventor's last name should be changed from "Clarke" to -- Clark --.

The spelling of the Assignee's name should be changed from "Dunlap" to -- Dunlop --.

Column 3, lines 55 and 56, change the formula from:

"$(CH_3CH(OH)CH_2)_2N-CH_2-CH_2-N(CH2-CH(OH)-CH_3)_2$"

to:   -- $(CH_3CH(OH)CH_2)_2N-CH_2-CH_2-N(CH_2-CH(OH)-CH_3)_2$ --.

Signed and sealed this 1st day of July 1975.

(SEAL)
Attest:

RUTH C. MASON
Attesting Officer

C. MARSHALL DANN
Commissioner of Patents
and Trademarks